Patented Mar. 22, 1927.

1,621,969

UNITED STATES PATENT OFFICE.

NIELS C. CHRISTENSEN, OF SALT LAKE CITY, UTAH.

PROCESS FOR THE TREATMENT OF ORES WITH CHLORIDE SOLUTIONS.

No Drawing.   Application filed May 18, 1926.   Serial No. 110,025.

This invention relates to improvements in processes for the treatment of ores of lead and silver with chloride brines. It relates particularly to specific modifications and methods of using the processes of treating such ores described in U. S. Patents Nos. 1,539,711, 1,539,712, 1,436,891, 1,434,087 and 1,441,063. As noted in these patents, a hot chloride brine containing acid or ferric chloride will dissolve the silver and lead sulphides out of such ores in the said brines. As also noted the hot brines will carry in solution a considerably larger amount of lead chloride than the cold brines. A concentrated brine will also carry in solution a considerably larger amount of $PbCl_2$ than a relatively dilute brine. These facts are made use of to recover the lead from the ores in the form of $PbCl_2$ by separating the hot concentrated pregnant solution from the ore and thereafter cooling or preferably cooling and diluting the pregnant solution to precipitate out lead chloride. In the carrying out of these steps, however, certain difficulties may be encountered and certain precautions must be taken to secure the best results. For example the securing of filters which will satisfactorily handle the hot corrosive brines containing acid or ferric chloride is a problem which may cause some difficulty in carrying out the processes. Also to use a minimum of solution in the process the pregnant brine should carry as high a percentage of lead chloride as possible, which makes necessary the use of concentrated solutions at the highest possible temperature. As the solutions are used over and over again the chlorides which are able to carry less $PbCl_2$ in solution (such as $FeCl_2$, $MnCl_2$, $ZnCl_2$, etc.) than NaCl or $CaCl_2$ build up in the preferred NaCl or $CaCl_2$ brines and reduce the amount of $PbCl_2$ which the chloride brine will carry in solution. It is the object of my invention to overcome to a certain extent the difficulties mentioned above; to avoid the necessity of filtering the hot corrosive (acid or ferric chloride) brine, to use a minimum volume of the hot corrosive solutions in the chloridizing and of the PbS and AgS in the ore, and to make possible the use of the fouled solutions for the conversion of the lead and silver to chlorides and avoid the necessity of "cleaning up" these solutions, and at the same time recover the lead chloride (and silver) in a relatively pure condition.

These objects are attained by first treating the ore with sufficient of the hot acid brine, or hot brine containing ferric chloride, to convert the lead and silver in the ore to the chlorides. Thereafter the residual acid or ferric chloride in the pulp is neutralized with calcium carbonate (or carbonate ore) and the pulp cooled or diluted and cooled so as to precipitate as much as possible of the $PbCl_2$ held in solution. The cold neutral or practically neutral solution is then filtered away from the mixture of residual ore and $PbCl_2$ and the residual brine is washed out of the mixture of ore and $PbCl_2$ with water. The wash solution thus obtained is preferably used to dilute the pulp before cooling in the next cycle of the process as described in the foregoing. The $PbCl_2$ is then dissolved out of the neutral pulp with a hot clean brine from which the lead may be precipitated as a chloride by cooling or as a chromate or arsenate or other insoluble lead compounds by the addition of sodium chromate, sodium arsenate or other suitable soluble salt of sodium (or potassium or calcium), or as metallic lead by electrolysis as described in U. S. Patent 1,539,714.

My preferred methods of carrying out the various steps of the process described in the foregoing are briefly as follows: The ore is preferably finely ground (100–200 mesh) in order to reduce to a minimum the time of treatment required with the hot acid brine (or brine containing ferric chloride). The finely ground ore is then agitated from 15 to 45 minutes with the hot acid brine, or brine containing ferric chloride, at a temperature preferably just below the boiling point of the brine. The small amount of residual acid left in the pulp may then be neutralized by the addition of finely divided limestone or carbonate ore preferably in very small excess and the pulp diluted by the addition of the wash solution from a previous cycle. The diluted pulp is then cooled by passing a current of cold air through a spray of the pulp preferably formed by the method and with the apparatus described in my U. S. Patent No. 1,462,363. If desired the residual acid in the pulp may be neutralized with the $CaCO_3$ or carbonate ore after the cooling or cooling and dilution of the pulp. If the solutions are very foul less lead will be precipitated from the cold solution than from the hot solution by the neutralization of the acid or ferric chloride. The neutralization of the acid and ferric chloride removes those constituents of the solution which rapidly destroy ordinary filter media such as cotton on wool cloths. Hot brines containing HCl, AlCl₃ and FeCl₃ destroy cotton cloths in a few hours, and wool cloths in a few days. These are all neutralized or removed by the finely divided CaCO₃ or carbonate ore as indicated in the following chemical equations:

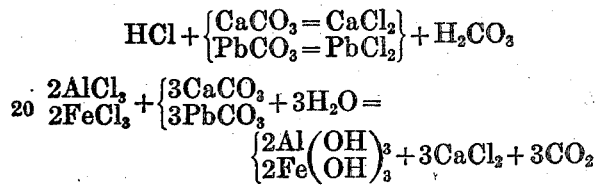

The cold neutral brine may be filtered without difficulty with ordinary cotton (or wool) filter cloths and the pulp and solution may be handled with ordinary non-corrosion proof apparatus. The neutral solution is filtered away and the ore is washed with water to remove the residual brine. The wash solution is preferably reserved and used to dilute the pulp in the next cycle. The cold and preferably diluted brine solution filtered away from the ore must be concentrated and heated before being reused. This is preferably done by passing the hot gases from a furnace directly through a spray of solution made by means of the spray apparatus described in U. S. Patent No. 1,462,363. The silver in this hot concentrated solution is precipitated with metallic lead before the solution is mixed with new ore and used over again. The washed ore containing the lead chloride is then leached with hot clean brine to dissolve out the PbCl₂. This is preferably carried out by agitating the ore and PbCl₂ with the hot concentrated brine for a short period and thereafter the clean pregnant solution is filtered away from the ore and the residual pregnant solution is washed out preferably with hot water. From the clean pregnant solution the lead may be precipitated by mixing the pregnant solution and wash water and cooling the mixture by means of passing a current of cold air through a spray of the solution preferably made by the method and with the apparatus described in U. S. Patent No. 1,462,363. If desired the lead may be precipitated from the pregnant solution as an insoluble salt such as the chromate or arsenate as described above.

It will be apparent from the foregoing that by the foregoing methods some of the main difficulties encountered in leaching ores with brine solutions containing acid or ferric chloride are avoided and that these methods may be used to advantage in the treatment of many ores in the treatment of which the brines are rapidly fouled by the dissolving of soluble compounds of iron, aluminum, manganese, zinc, etc., contained in the ore. By these methods a minimum of acid or brine or ferric chloride brine may be used in the treatment of the ore since this hot solution is not separated from the ore but merely used to chloridize the lead in the ore by dissolving as much as possible and thereafter depositing the chloride in the ore and even chloridizing some which may not be thus dissolved and precipitated by cooling. By these methods foul solutions may be used over and over again since when hot they will carry sufficient lead in solution and are active enough to allow the use of a practical amount of the solution in the treatment of the ore. By these methods the pulp and solution may be filtered and handled after treatment with the corrosive brine solutions, with ordinary non-corrosion proof filters, pumps, etc. The lead chloride is also recovered in a relatively pure solution by these methods and may therefore be used for the manufacture of lead compounds by direct precipitation from the clean brine.

In the appended claims by the term "chloride brines" is meant a concentrated solution of sodium chloride, or calcium chloride or a mixture of either one or both of these with minor amounts of such chlorides as FeCl₂, MnCl₂, MgCl₂, etc. By the term "corrosive constituents" is meant such compounds as HCl, H₂SO₄, FeCl₃, AlCl₃, etc., which rapidly corrode all common metals and alloys and rapidly destroy organic filter media such as cotton or wool filter cloths. By the term "readily soluble oxidized compound" is meant such compounds as CaCO₃ (or CaO or Ca(OH)₂) or carbonate ores of lead or zinc.

Having described my process what I claim and desire to patent is:

1. In the treatment of ores with chloride brines, the improvement which consists in neutralizing the corrosive constituents of the solution by adding a readily soluble oxidized compound to the mixture of ore and brine after the treatment of said ore with said chloride brine.

2. In the treatment of ores with chloride brines, the improvement which consists in neutralizing the corrosive constituents of the solution by adding an oxidized compound to the mixture of ore and brine which is readily acted upon by the corrosive constituents of the brine solution, after the treatment of said ore with said chloride brine.

3. In the treatment of ores with chloride brines, the improvement which consists in neutralizing the corrosive constituents of the solution by adding a carbonate compound to the mixture of ore and brine after the treatment of said ore with said brine.

4. In the treatment of ores with chloride brines, the improvement which consists in neutralizing the corrosive constituents of the solution by adding a carbonate compound to the mixture of ore and brine which is readily acted upon by the corrosive constituents of the brine solution, after the treatment of said ore with said brine.

5. In the treatment of ores with chloride brines, the improvement which consists in neutralizing the corrosive constituents of the solution by adding calcium carbonate to the mixture of ore and brine, after the treatment of said ore with said brine.

6. In the treatment of ores with chloride brines, the improvement which consists in neutralizing the corrosive constituents of the solution by adding a readily soluble oxidized compound to the mixture of ore and brine after the treatment of said ore with said chloride brine, and separating said brine from said treated ore and using it in the treatment of more ore.

7. In the treatment of ores with chloride brines, the improvement which consists in neutralizing the corrosive constituents of the solution by adding an oxidized compound to the mixture of ore and brine which is readily acted upon by the corrosive constituents of the brine solution after the treatment of said ore with said chloride brine, and separating said brine from said treated ore and using it in the treatment of more ore.

8. In the treatment of ores with chloride brines, the improvement which consists in neutralizing the corrosive constituents of the solution by adding a carbonate compound to the mixture of ore and brine after the treatment of said ore with said brine, and separating said brine from said treated ore and using it in the treatment of more ore.

9. In the treatment of ores with chloride brines, the improvement which consists in neutralizing the corrosive constituents of the solution by adding a carbonate compound to the mixture of ore and brine which is readily acted upon by the corrosive constituents of the brine solution, after the treatment of said ore with said brine, and separating said brine from said treated ore and using it in the treatment of more ore.

10. In the treatment of ores with chloride brines, the improvement which consists in neutralizing the corrosive constituents of the solution by adding calcium carbonate to the mixture of ore and brine, after the treatment of said ore with said brine, and separating said brine from said treated ore and using it in the treatment of more ore.

11. In the treatment of ores with chloride brines, the improvement which consists in neutralizing the corrosive constituents of the solution by adding a readily soluble oxidized compound to the mixture of ore and brine after the treatment of said ore with said chloride brine, and separating said brine from said treated ore and precipitating the dissolved lead and silver therefrom and using it in the treatment of more ore.

12. In the treatment of ores with chloride brines, the improvement which consists in neutralizing the corrosive constituents of the solution by adding an oxidized compound to the mixture of ore and brine which is readily acted upon by the corrosive constituents of the brine solution after the treatment of said ore with said chloride brine, and separating said brine from said treated ore and precipitating the dissolved lead and silver therefrom and using it in the treatment of more ore.

13. In the treatment of ores with chloride brines, the improvement which consists in neutralizing the corrosive constituents of the solution by adding a carbonate compound to the mixture of ore and brine after the treatment of said ore with said brine, and separating said brine from said treated ore and precipitating the dissolved lead and silver therefrom and using it in the treatment of more ore.

14. In the treatment of ores with chloride brines, the improvement which consists in neutralizing the corrosive constituents of the solution by adding a carbonate compound to the mixture of ore and brine which is readily acted upon by the corrosive constituents of the brine solution, after the treatment of said ore with said brine, and separating said brine from said treated ore and precipitating the dissolved lead and silver therefrom and using it in the treatment of more ore.

15. In the treatment of ores with chloride brines, the improvement which consists in neutralizing the corrosive constituents of the solution by adding calcium carbonate to the mixture of ore and brine, after the treatment of said ore with said brine, and separating said brine from said treated ore and precipitating the dissolved lead and silver therefrom and using it in the treatment of more ore.

16. In the treatment of ores with chloride brines, the neutralization of the corrosive constituents in the solution after the treatment of the ore with said brine and the cooling of said mixture of treated ore and brine to precipitate $PbCl_2$ from said solution in said mixture.

17. In the treatment of ores with chloride brines, the neutralization of the corrosive constituents in the solution after the treatment of the ore with said brine and the cooling of said mixture of treated ore and brine to precipitate $PbCl_2$ from said solution in said mixture and thereafter separating said cold brine from said ore and using it in the treatment of more ore.

18. In the treatment of ores with chloride brines, the neutralization of the corrosive constituents in the solution after the treatment of the ore with said brine and the cooling of said mixture of treated ore and brine to precipitate $PbCl_2$ from said solution in said mixture and thereafter separating said cold brine from said ore and using it in the treatment of more ore and dissolving the $PbCl_2$ out of said mixture of ore and $PbCl_2$ with a clean concentrated brine.

19. In the treatment of ores with chloride brines, the neutralization of the corrosive constituents in the solution after the treatment of the ore with said brine and the cooling of said mixture of treated ore and brine to precipitate $PbCl_2$ from said solution in said mixture and thereafter separating said cold brine from said ore and using it in the treatment of more ore and dissolving the $PbCl_2$ out of said mixture of ore and $PbCl_2$ with a clean concentrated brine and thereafter precipitating the lead from said clean pregnant brine.

20. In the treatment of ores with chloride brines, the neutralization of the corrosive constituents in the solution after the treatment of the ore with said brine and the cooling of said mixture of treated ore and brine to precipitate $PbCl_2$ from said solution in said mixture and thereafter separating said cold brine from said ore and using it in the treatment of more ore and dissolving the $PbCl_2$ out of said mixture of ore and $PbCl_2$ with a clean concentrated brine and thereafter precipitating the lead from said clean pregnant brine by cooling said brine.

21. In the treatment of ores with chloride brines, the neutralization of the corrosive constituents in the solution after the treatment of the ore with said brine and the cooling of said mixture of treated ore and brine to precipitate $PbCl_2$ from said solution in said mixture and thereafter separating said cold brine from said ore and using it in the treatment of more ore and dissolving the $PbCl_2$ out of said mixture of ore and $PbCl_2$ with a clean concentrated brine and thereafter precipitating the lead from said clean pregnant brine by cooling and diluting said brine.

22. In the treatment of ores with chloride brines, the neutralization of the corrosive constituents in the solution after treatment of the ore with said brine and the dilution and cooling of said mixture of treated ore and brine to precipitate $PbCl_2$ from said solution in said mixture.

23. In the treatment of ores with chloride brines, the neutralization of the corrosive constituents in the solution after the treatment of the ore with said brine and the cooling of said mixture of treated ore and brine to precipitate $PbCl_2$ from said solution in said mixture and thereafter separating said cold brine from said ore and using it in the treatment of more ore and dissolving the $PbCl_2$ out of said mixture of ore and $PbCl_2$ with a clean concentrated brine and thereafter precipitating the lead from said clean pregnant brine by cooling said brine and thereafter separating said cold dilute brine from said ore and concentrating it and using it in the treatment of more ore.

24. In the treatment of ores with chloride brines, the neutralization of the corrosive constituents in the solution after the treatment of the ore with said brine and the cooling of said mixture of treated ore and brine to precipitate $PbCl_2$ from said solution in said mixture and thereafter separating said cold brine from said ore and using it in the treatment of more ore and dissolving the $PbCl_2$ out of said mixture of ore and $PbCl_2$ with a clean concentrated brine and thereafter precipitating the lead from said clean pregnant brine by cooling said brine and thereafter separating said cold dilute brine from said ore and concentrating it and using it in the treatment of more ore and dissolving the $PbCl_2$ out of said mixture of ore and $PbCl_2$ with a clean concentrated brine.

25. In the treatment of ores with chloride brines, the neutralization of the corrosive constituents in the solution after the treatment of the ore with said brine and the cooling of said mixture of treated ore and brine to precipitate $PbCl_2$ from said solution in said mixture and thereafter separating said cold brine from said ore and using it in the treatment of more ore and dissolving the $PbCl_2$ out of said mixture of ore and $PbCl_2$ with a clean concentrated brine and thereafter precipitating the lead from said clean pregnant brine by cooling said brine and thereafter separating said cold dilute brine from said ore and concentrating it and using it in the treatment of more ore and dissolving the $PbCl_2$ out of said mixture of ore and $PbCl_2$ with a clean concentrated brine and thereafter precipitating the lead from said clean pregnant brine.

26. In the treatment of ores with chloride brines, the neutralization of the corrosive constituents in the solution after the treatment of the ore with said brine and the cooling of said mixture of treated ore and brine to precipitate $PbCl_2$ from said solution in said mixture and thereafter separating said cold brine from said ore and using it in the treatment of more ore and dissolving the $PbCl_2$ out of said mixture of ore and $PbCl_2$ with a clean concentrated brine and thereafter precipitating the lead from said clean pregnant brine by cooling said brine and thereafter separating said cold dilute brine from said ore and concentrating it and using it in the treatment of more ore and dissolving the $PbCl_2$ out of said mixture of ore and $PbCl_2$ with a clean concentrated brine and thereafter precipitating the lead from said clean pregnant brine by cooling said brine.

27. In the treatment of ores with chloride brines, the neutralization of the corrosive constituents in the solution after the treatment of the ore with said brine and the cooling of said mixture of treated ore and brine to precipitate $PbCl_2$ from said solution in said mixture and thereafter separating said cold brine from said ore and using it in the treatment of more ore and dissolving the $PbCl_2$ out of said mixture of ore and $PbCl_2$ with a clean concentrated brine and thereafter precipitating the lead from said clean pregnant brine by cooling said brine and thereafter separating said cold dilute brine from said ore and concentrating it and using it in the treatment of more ore and dissolving the $PbCl_2$ out of said mixture of ore and $PbCl_2$ with a clean concentrated brine by cooling and diluting said brine.

In testimony whereof I have signed my name to this specification.

NIELS C. CHRISTENSEN.